(12) United States Patent
Hemrle et al.

(10) Patent No.: US 8,904,793 B2
(45) Date of Patent: Dec. 9, 2014

(54) THERMOELECTRIC ENERGY STORAGE SYSTEM WITH AN INTERMEDIATE STORAGE TANK AND METHOD FOR STORING THERMOELECTRIC ENERGY

(75) Inventors: Jaroslav Hemrle, Baden-Dättwil (CH); Lilian Kaufmann, Birmenstorf (CH); Mehmet Mercangoez, Stein (CH)

(73) Assignee: ABB Research Ltd., Zurich (CH)

( * ) Notice: Subject to any disclaimer, the term of this patent is extended or adjusted under 35 U.S.C. 154(b) by 231 days.

(21) Appl. No.: 13/325,706

(22) Filed: Dec. 14, 2011

(65) Prior Publication Data

US 2012/0080168 A1 Apr. 5, 2012

Related U.S. Application Data

(63) Continuation of application No. PCT/EP2010/057946, filed on Jun. 8, 2010.

(30) Foreign Application Priority Data

Jun. 18, 2009 (EP) .................................... 09163084

(51) Int. Cl.
*F01K 1/00* (2006.01)
*F28D 20/00* (2006.01)
*F01K 3/12* (2006.01)
*F28D 20/02* (2006.01)

(52) U.S. Cl.
CPC . *F01K 3/12* (2013.01); *F28D 20/00* (2013.01); *Y02E 60/142* (2013.01); *F28D 20/0034* (2013.01); *F28D 20/02* (2013.01)
USPC ............................................. 60/659; 60/643

(58) Field of Classification Search
USPC .......................................... 60/659, 643; 165/4
See application file for complete search history.

(56) References Cited

U.S. PATENT DOCUMENTS 3,152,442 A * 10/1964 Rowekamp .................. 60/641.8
5,269,145 A * 12/1993 Krause et al. .................... 60/659
2008/0022683 A1* 1/2008 Ohler et al. .................. 60/641.8

FOREIGN PATENT DOCUMENTS

| EP | 1577548 A1 | 9/2005 |
| EP | 2157317 A2 | 2/2010 |
| GB | 423093 A | 1/1935 |

OTHER PUBLICATIONS

Notification Concerning Transmittal of International Preliminary Report on Patentability (Forms PCT/IB/326 and PCT/IB/373) and the Written Opinion of the International Searching Authority (Form PCT/ISA/237) issued on Jan. 5, 2012, in the corresponding International Application No. PCT/EP2010/057946.
International Search Report (PCT/ISA/210) issued on Oct. 7, 2010, by European Patent Office as the International Searching Authority for International Application No. PCT/EP2010/057946.
European Search Report issued Sep. 27, 2010 for European Application No. 09163084.

* cited by examiner

*Primary Examiner* — Thomas Denion
*Assistant Examiner* — Kelsey Stanek
(74) *Attorney, Agent, or Firm* — Buchanan Ingersoll & Rooney PC

(57) ABSTRACT

A system and method are provided for storing electric energy in the form of thermal energy. A thermoelectric energy storage system includes a working fluid circuit for circulating a working fluid through a heat exchanger, and a thermal storage medium circuit for circulating a thermal storage medium. The thermal storage medium circuit includes at least one hot storage tank, an intermediate temperature storage tank, and a cold storage tank connected together via the heat exchanger. A proportion of the storage medium is redirected to or from the intermediate storage tank from or to the hot or cold storage tank, joining another proportion which flows directly between the cold and hot storage tank.

16 Claims, 6 Drawing Sheets

THERMOELECTRIC ENERGY STORAGE SYSTEM WITH AN INTERMEDIATE STORAGE TANK AND METHOD FOR STORING THERMOELECTRIC ENERGY

RELATED APPLICATION

This application claims priority as a continuation application under 35 U.S.C. §120 to PCT/EP 2010/057946, which was filed as an International Application on Jun. 8, 2010 designating the U.S., and which claims priority to European Application 09163084.8 filed in Europe on Jun. 18, 2009. The entire contents of these applications are hereby incorporated by reference in their entireties.

FIELD

The present disclosure relates generally to the storage of electric energy. More particularly, the present disclosure relates to a system and method for storing electric energy in the form of thermal energy in a thermal energy storage.

BACKGROUND INFORMATION

Base load generators such as nuclear power plants and generators with stochastic, intermittent energy sources, such as wind turbines and solar panels, generate excess electrical power during times of low power demand. Large-scale electrical energy storage systems are a means of diverting this excess energy to times of peak demand and balance the overall electricity generation and consumption.

In EP 1577548, the applicant has described the concept of a thermoelectric energy storage (TEES) system. A TEES converts excess electricity to heat in a charging cycle, stores the heat, and converts the heat back to electricity in a discharging cycle, when necessary. Such an energy storage system is robust, compact, site independent and is suited to the storage of electrical energy in large amounts. Thermal energy can be stored in the form of sensible heat via a change in temperature or in the form of latent heat via a change of phase or a combination of both. The storage medium for the sensible heat can be a solid, liquid, or gas. The storage medium for the latent heat occurs via a change of phase and can involve any of these phases or a combination of them in series or in parallel.

The round-trip efficiency of an electrical energy storage system can be defined as the percentage of electrical energy that can be discharged from the storage in comparison to the electrical energy used to charge the storage, provided that the state of the energy storage system after discharging returns to its initial condition before charging of the storage. Round-trip efficiency is increased when thermodynamic reversibility factors are maximized. However, it is important to point out that all electric energy storage technologies inherently have a limited round-trip efficiency. Thus, for every unit of electrical energy used to charge the storage, only a certain percentage is recovered as electrical energy upon discharge. The rest of the electrical energy is lost. If, for example, the heat being stored in a TEES system is provided through resistor heaters, it has approximately 40% round-trip efficiency. The efficiency of thermoelectric energy storage is limited for various reasons rooted in the second law of thermodynamics. Firstly, the conversion of heat to mechanical work in a heat engine is limited to the Carnot efficiency. Secondly, the coefficient of performance of any heat pump declines with increased difference between input and output temperature levels. Thirdly, any heat flow from a working fluid to a thermal storage and vice versa requires a temperature difference in order to happen. This fact inevitably degrades the temperature level and thus the capability of the heat to do work.

It is also noted that the charging cycle of a TEES system is also referred to as a heat pump cycle and the discharging cycle of a TEES system is also referred to as a heat engine cycle. In the TEES concept, heat needs to be transferred from a hot working fluid to a thermal storage medium during the heat pump cycle and back from the thermal storage medium to the working fluid during the heat engine cycle. A heat pump requires work to move thermal energy from a cold source to a warmer heat sink. Since the amount of energy deposited at the hot side is greater than the work required by an amount equal to the energy taken from the cold side, a heat pump will "multiply" the heat as compared to resistive heat generation. The ratio of heat output to work input is called coefficient of performance, and it is a value larger than one. In this way, the use of a heat pump will increase the round-trip efficiency of a TEES system.

In EP 08162614, the applicant has described the concept of utilizing transcritical thermodynamic cycles to improve TEES systems. FIG. 1 illustrates temperature profiles in a heat exchanger in contact with a thermal storage medium during charging and discharging cycles of a transcritical TEES system. The abscissa represents the provided heat in the system, the ordinate represents the temperature, and the lines on the graph are isobars. The solid line indicates the temperature profile of the working fluid in a transcritical TEES charging cycle. The dotted line indicates the temperature profile of the working fluid in a transcritical TEES discharging cycle. The straight diagonal dashed line indicates the temperature profile of the thermal storage medium in a transcritical TEES cycle. Heat can only flow from a higher to a lower temperature. Consequently, the characteristic profile for the working fluid during cooling in the charging cycle has to be above the characteristic profile for the thermal storage media, which in turn has to be above the characteristic profile for the working fluid during heating in the discharging cycle. The temperature profiles are stationary in time due to the sensible heat storage in the thermal storage medium. Thus, while the volume of thermal storage medium in the heat exchanger remains constant, the volume of the hot and cold thermal storage medium stored in the hot-fluid and cold-fluid storage tanks changes. Also, the temperature distribution in the heat exchanger remains constant.

A transcritical cycle is defined as a thermodynamic cycle where the working fluid goes through both subcritical and supercritical states. There is no distinction between a gas phase and a vapor phase beyond the critical point and therefore there is no evaporation or boiling (in the regular meaning) in the transcritical cycle.

It is established that the transfer of heat over large temperature differences is a thermodynamic irreversibility factor. In FIG. 1, the maximum temperature difference, ΔTmax, between the thermal storage medium and the working fluid on discharging and the minimum temperature difference, ΔTmin, between the thermal storage medium and the working fluid on charging, are both indicated. In order to minimize the maximum temperature difference ΔTmax, relatively large heat exchangers could be constructed or phase change materials can be used for thermal storage. Problematically, these solutions result in a high capital cost and therefore are not generally practical.

Furthermore, even if relatively large heat exchangers are used, the thermodynamic properties of the working fluid act to limit the minimization of temperature differences. This is shown by the curvature in the working fluid temperature profiles (isobars) in FIG. 1. The curvature results in an "internal pinch point" and increases the average temperature difference regardless of the size of the heat exchanger. "Pinch analysis" is a known methodology for minimizing energy consumption in processing systems by determining thermodynamically feasible heat exchange networks.

As would be apparent to the person skilled in the art, a reduction of heat transfer losses are of particular importance in the considered application of thermal energy storage with charging based on a heat pump cycle. In such an application, any increase of heat exchange temperature losses during charging and discharging directly translates to loss of useful work and reduction of the round trip efficiency of the system.

Thus, there is a desire to provide an efficient thermoelectric energy storage having a high round-trip efficiency and a minimal approach temperature, while minimizing the amount of required thermal storage medium, and also minimizing the capital cost.

SUMMARY

An exemplary embodiment of the present disclosure provides a thermoelectric energy storage system having a charging cycle for providing thermal energy to a thermal storage, and a discharging cycle for generating electricity by retrieving the thermal energy from the thermal storage. The exemplary thermoelectric energy storage system includes a heat exchanger, and a working fluid circuit for circulating a working fluid through the heat exchanger, where the working fluid undergoes a transcritical process during heat transfer in the heat exchanger. The exemplary thermoelectric energy storage system also includes a thermal storage medium circuit for circulating a thermal storage medium, the thermal storage medium circuit having at least one hot storage tank, an intermediate temperature storage tank and a cold storage tank connected together via the heat exchanger. In addition, the exemplary thermoelectric energy storage system includes means for modifying a rate of flow of the thermal storage medium in the heat exchanger by varying an input rate of flow of the thermal storage medium to the intermediate storage tank, and by varying an output rate of flow of the thermal storage medium from the intermediate storage tank.

An exemplary embodiment of the present disclosure provides a method for storing and retrieving energy in a thermoelectric energy storage system. The exemplary method includes circulating a thermal storage medium between a hot storage tank, an intermediate storage tank and a cold storage tank connected together via a heat exchanger. The exemplary method also includes charging the system by heating the thermal storage medium, and discharging the system by heating a working fluid in a working fluid circuit with heat from the thermal storage medium. The working fluid undergoes a transcritical process during heat transfer in the heat exchanger, and the working fluid is expanded through a thermodynamic machine. In addition, the exemplary method includes modifying a rate of flow of the thermal storage medium through the heat exchanger by varying the input rate of flow of thermal storage medium to the intermediate storage tank, and by varying the output rate of flow of thermal storage medium from the intermediate storage tank.

BRIEF DESCRIPTION OF THE DRAWINGS

Additional refinements, advantages and features of the present disclosure are described in more detail below with reference to exemplary embodiments illustrated in the drawings, in which.

For consistency, the same reference numerals are used to denote similar elements illustrated throughout the drawings.

DETAILED DESCRIPTION

Figure 1:
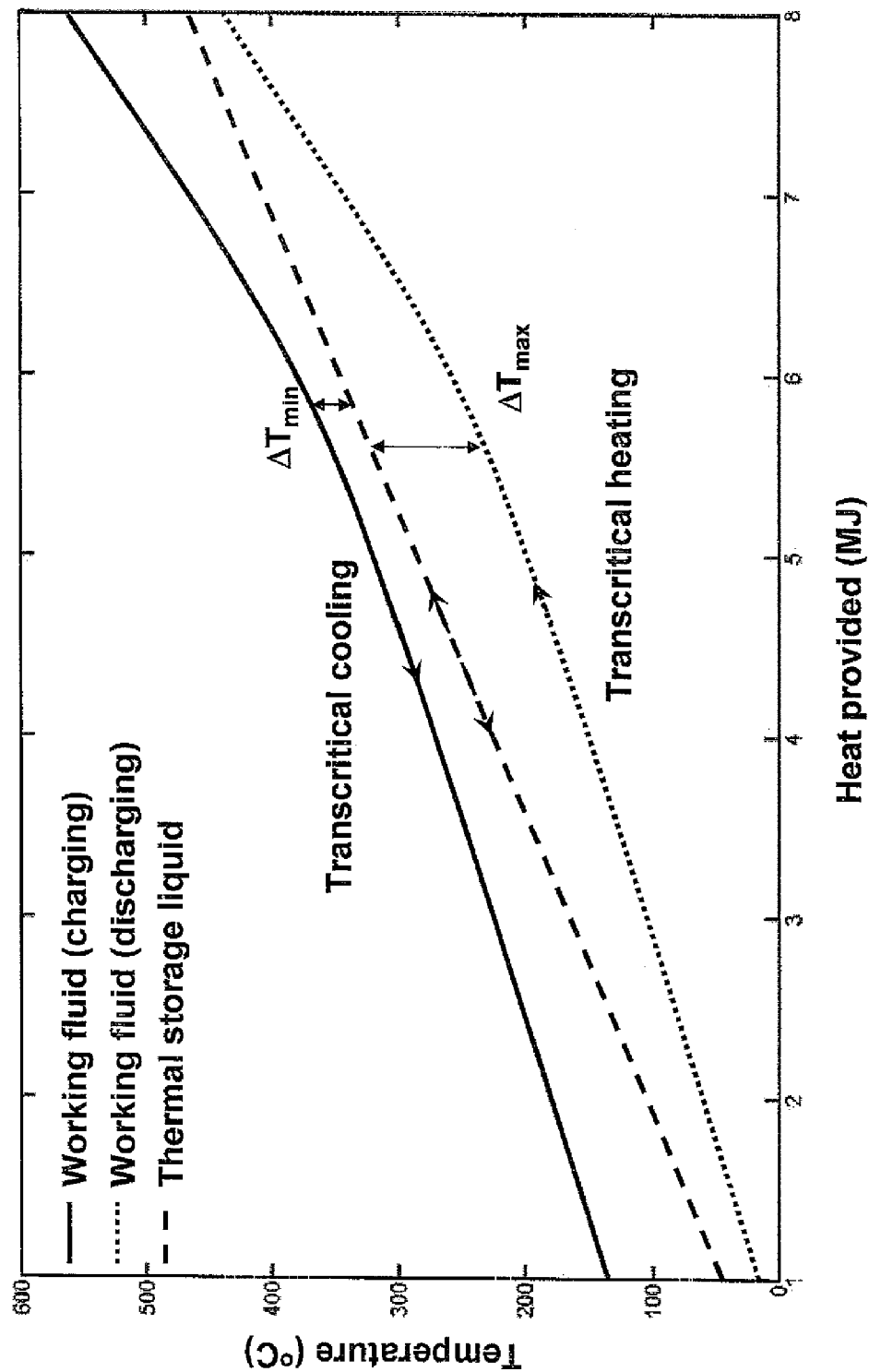
FIG. 1 shows a heat flow-temperature diagram of the heat transfer from the cycles in a known transcritical TEES system.

Exemplary embodiments of the present disclosure provide a thermoelectric energy storage system for converting electrical energy into thermal energy to be stored and converted back to electrical energy with an improved round-trip efficiency. Exemplary embodiments of the present disclosure provide a thermoelectric energy storage system and a method for storing and retrieving energy in a thermoelectric energy storage system.

According to an exemplary embodiment of the present disclosure, a thermoelectric energy storage system has a charging cycle for providing thermal energy to a thermal storage, and a discharging cycle for generating electricity by retrieving the thermal energy from the thermal storage. The thermoelectric energy storage system includes a working fluid circuit for circulating a working fluid through a heat exchanger, and a thermal storage medium circuit for circulating a thermal storage medium. The thermal storage medium circuit includes at least one hot storage tank, an (e.g., one) intermediate temperature storage tank, and a (e.g., one) cold storage tank connected together via the heat exchanger. A rate of flow of the thermal storage medium in the heat exchanger is modifiable by a variation in the input rate of flow of the thermal storage medium to the intermediate storage tank and variation in the output rate of flow of the thermal storage medium from the intermediate storage tank. Modifying or adapting the flow rate of the thermal storage medium in the heat exchanger enables controlling the heat exchange process in view of an improved round-trip efficiency.

In accordance with an exemplary embodiment, the temperature of the hot storage tank is greater than the temperature of the intermediate temperature storage tank, which in turn is greater than the temperature of the cold storage tank. During charging and discharging, the temperature of each storage tank remains constant.

In accordance with an exemplary embodiment, the rate of flow of the thermal storage medium is modified in order to minimize, at any point of contact between the thermal storage medium and the working fluid in the heat exchanger, and during both charging and discharging cycles, the temperature difference between the working fluid and the thermal storage medium. In other words, the rate of flow of the thermal storage medium in the heat exchanger is adapted such that the isobar of the thermal storage medium closely follows the curvature of the isobar of the working fluid, during both charging and discharging cycles. To this purpose, a maximum temperature difference between the thermal storage medium and the working fluid is kept below 20%, for example, below 15%, of the temperature difference between the cold storage tank and the hot storage tank.

In accordance with an exemplary embodiment, the heat exchanger has an internal stream splitter configured to divide or join the stream of the thermal storage medium from the intermediate storage tank.

In accordance with an exemplary embodiment, the heat exchanger is divided into a first section and a second section. The thermal storage medium flows through both the first section and the second section, and a stream splitter is located between the first section and second section of the heat exchanger. The stream splitter is configured to divide or join the stream of the thermal storage medium from the intermediate storage tank.

In accordance with an exemplary embodiment, the heat exchanger is divided into a first section and a second section, and the thermal storage medium flows through both the first section and the second section via the intermediate storage tank.

In accordance with an exemplary embodiment, at least one further intermediate storage tank is connected in the thermal storage medium circuit, and the heat exchanger has a further internal stream splitter for each further intermediate storage tank.

At least one of the charging cycle or discharging cycle runs transcritically. Thus, the working fluid may undergo a transcritical cooling in the heat exchanger during a charging cycle of the thermoelectric energy storage system. When the thermoelectric energy storage system is in a charging cycle, the system includes an expander, an evaporator and a compressor. Further, the working fluid may undergo a transcritical heating in the heat exchanger during a discharging cycle of the thermoelectric energy storage system. When the thermoelectric energy storage system is in a discharging cycle, the system includes a pump, a condenser and a turbine.

An exemplary embodiment of the present disclosure provides a method for storing and retrieving energy in a thermoelectric energy storage system is provided. The method includes charging the system by heating a thermal storage medium. The thermal storage medium circulates between a hot storage tank, an intermediate storage tank and a cold storage tank connected together via a heat exchanger. The method also includes discharging the system by heating a working fluid in a working fluid circuit with heat from the thermal storage medium and expanding the working fluid through a thermodynamic machine. The rate of flow of the thermal storage medium through the heat exchanger is modified by varying the input rate of flow of thermal storage medium to the intermediate storage tank, and varying the output rate of flow of thermal storage medium from the intermediate storage tank.

Figure 2:
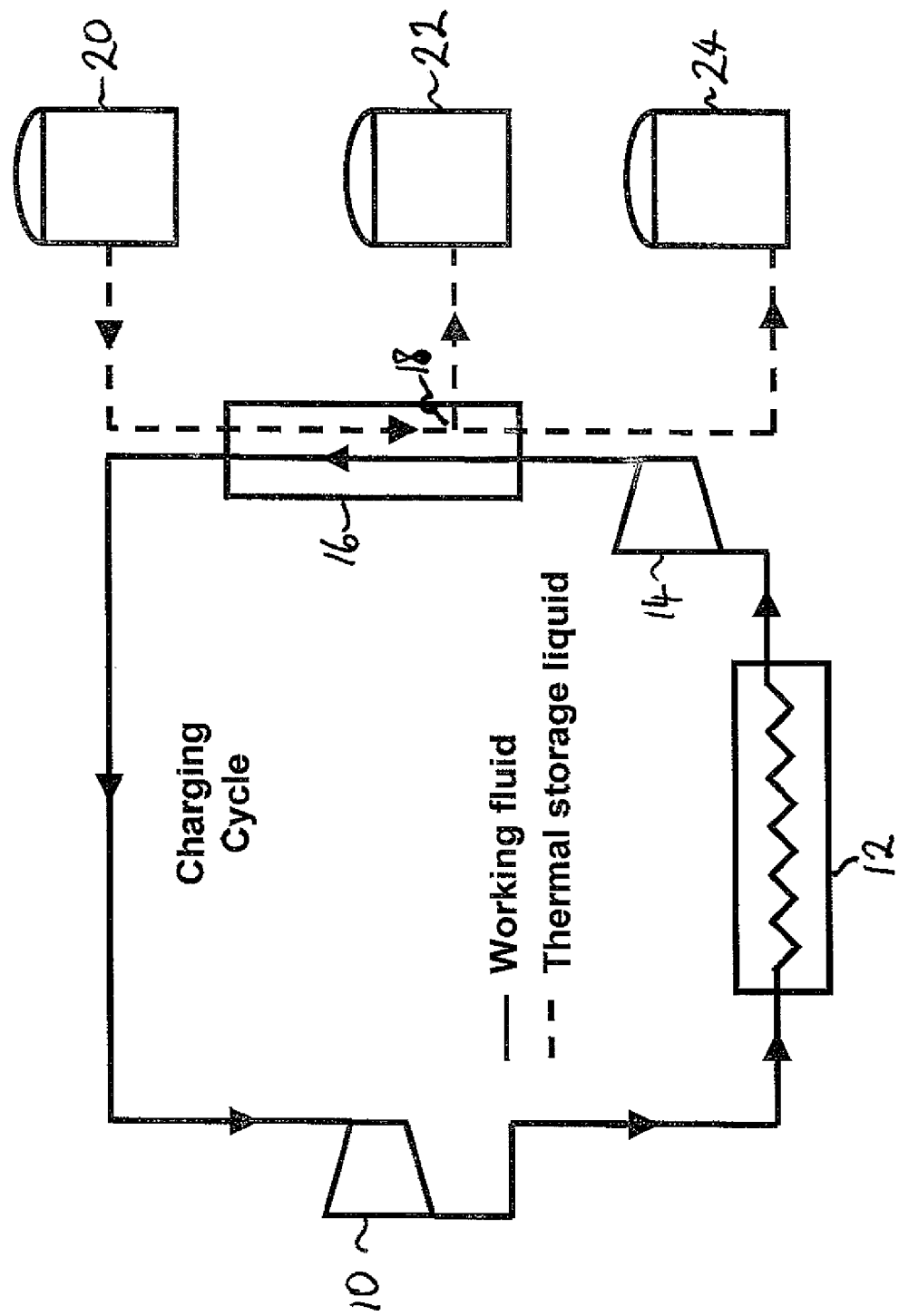
FIG. 2 shows a simplified schematic diagram of a charging cycle of a transcritical TEES system according to an exemplary embodiment of the present disclosure.
Figure 3:
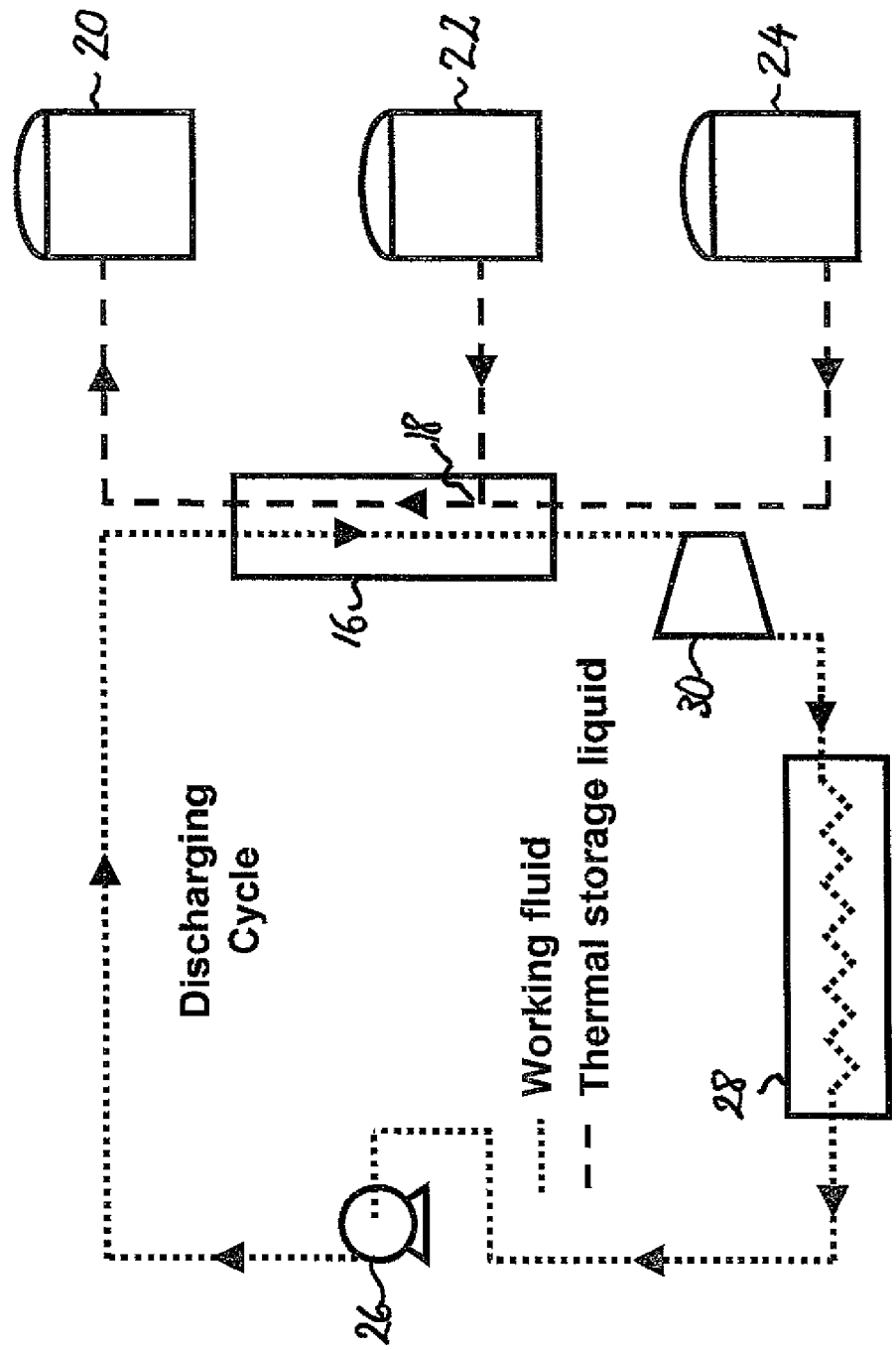
FIG. 3 shows a simplified schematic diagram of a discharging cycle of a transcritical TEES system according to an exemplary embodiment of the present disclosure.

FIGS. 2 and 3 schematically depict a charging cycle system and a discharging cycle system, respectively, of a transcritical TEES system in accordance with an exemplary embodiment of the present disclosure.

The charging cycle system shown in FIG. 2 includes a work recovering expander 10, an evaporator 12, a compressor 14 and a heat exchanger 16 having an internal stream splitter 18. A working fluid circulates through these components as indicated by the solid line with arrows in FIG. 2. Further, a cold-fluid storage tank 20, an intermediate storage tank 22 and a hot-fluid storage tank 24 containing a fluid thermal storage medium are connected together in parallel via the heat exchanger 16.

In operation, the charging cycle system performs a transcritical cycle and the working fluid flows around the TEES system in the following manner. The working fluid in the evaporator 12 absorbs heat from a cold thermal bath and evaporates. The vaporized working fluid is circulated to the compressor 14 and surplus electrical energy is utilized to compress and heat the working fluid to a supercritical state. (In such a supercritical state, the fluid is above the critical temperature and critical pressure.) The working fluid is fed through the heat exchanger 16 where the working fluid discards heat into the thermal storage medium. The compressed working fluid exits the heat exchanger 16 and enters the expander 10. Here the working fluid is expanded to the lower pressure at the evaporator inlet. The working fluid flows from the expander 10 back into the evaporator 12.

The thermal storage medium, represented by the dashed line in FIG. 2, is pumped from the cold-fluid storage tank 20 through the heat exchanger 16 into the hot-fluid storage tank 24 and partially into the intermediate storage tank 22. The temperature of the thermal storage medium is detected on either side of the internal stream splitter 18 by temperature sensors such as thermocouples or resistive sensors, for example. The heat discarded from the working fluid into the thermal storage medium is stored in the form of sensible heat.

Following detection of the temperature of the thermal storage medium on either side of the internal stream splitter 18, the flow rate of the thermal storage medium into the intermediate storage tank 22 and the hot-fluid storage tank 24 is adjusted. This is achieved by means of appropriate piping and valve arrangements. The initial valve openings are determined according to the desired temperature profile and the valve openings are fine-tuned during operation according to the temperature measurements.

The heat exchanger system is designed such that the position of the stream splitter 18 within the heat exchanger 16 coincides with the point of the heat exchanger 16 at which the storage medium is at the temperature level of the intermediate storage tank 22. The diverted stream is stored in the intermediate tank 22. The second stream continues through the rest of the heat exchanger 16 into the hot storage tank 24.

It is noted that in the heat exchanger 16 the working fluid pressure will be above the critical pressure, however the working fluid temperature may go below the critical temperature. Therefore, while the working fluid enters the heat exchanger 16 in a supercritical state, it may leave the heat exchanger in a subcritical state.

In the exemplary embodiment having a single stream splitting, the internal stream splitter 18 functions to join or divide the stream of thermal storage medium in the charging cycle and functions to join or divide the streams of thermal storage medium in the discharging cycle.

The discharging cycle system shown in FIG. 3 includes a pump 26, a condenser 28, a turbine 30 and a heat exchanger 16 having an internal stream splitter 18. A working fluid circulates through these components as indicated by the dotted line with arrows in FIG. 3. Further, a cold-fluid storage tank 20, an intermediate storage tank 22 and a hot-fluid storage tank 24 containing a fluid thermal storage medium are connected together in parallel via the heat exchanger 16. The thermal storage medium, represented by the dashed line in FIG. 3, is pumped from the hot-fluid storage tank 24 and from the intermediate storage tank 22 into the cold-fluid storage tank 20.

In operation, the discharging cycle system also performs a transcritical cycle and the working fluid flows around the TEES system in the following manner. Heat is transferred from the thermal storage medium to the working fluid causing the working fluid to go through transcritical heating. The working fluid then exits the heat exchanger 16 in a supercritical state and enters the turbine 30 where the working fluid is expanded, thereby causing the turbine coupled to a generator to generate electrical energy. Next, the working fluid enters the condenser 28, where the working fluid is condensed by exchanging heat with a cold thermal bath. The condensed working fluid exits the condenser 28 via an outlet and is pumped again beyond its critical pressure into the heat exchanger 16 via the pump 26.

The thermal storage medium, represented by the dashed line in FIG. 3, is pumped from the hot-fluid storage tank 24 and the intermediate storage tank 22, through the heat exchanger 16 into the cold-fluid storage tank 20. The temperature of the thermal storage medium is detected and monitored on either side of the internal stream splitter 18.

While the charging cycle system of FIG. 2 and the discharging cycle system of FIG. 3 have been illustrated separately, the heat exchanger 16, cold-fluid storage tank 20, intermediate fluid storage tank 22, hot-fluid storage tank 24 and thermal storage medium are common to both. The charging and discharging cycles may be performed consecutively, not simultaneously.

In other words, an exemplary embodiment of the present disclosure provides a thermoelectric energy storage system which has a charging cycle for providing thermal energy to a thermal storage, and a discharging cycle for generating electricity by retrieving the thermal energy from the thermal storage. The thermoelectric energy storage system includes a thermal storage medium conduit with at least one cold storage tank 20 and a (e.g., one) hot storage tank 24, a thermal storage medium and means to transfer the thermal storage medium from the cold storage tank 20 to the hot storage tank 24 during charging and from the hot storage tank 24 to the cold storage tank 20 during discharging. The thermoelectric energy storage system also includes at least one heat exchanger 16 connected to the thermal storage medium conduit between the cold storage tank 20 and the hot storage tank 24 for exchanging heat between the thermal storage medium and a working fluid of a working fluid circuit, where the working fluid undergoes a transcritical process during heat transfer. In addition, the thermal storage medium conduit branches to at least one additional intermediate storage tank 22 with a temperature between that of the cold storage tank (20) and that of the hot storage tank 24. During charging some proportion of the thermal storage medium from the cold storage tank 20 is split off and directed to the intermediate storage tank 22 after passing through some part of the heat exchanger 16, or alternatively a portion of thermal storage medium from the intermediate storage tank 22 is combined with the thermal storage medium from the cold storage tank 24 before passing through some other part of the heat exchanger 16. During discharging, the thermal storage medium from the intermediate storage tank 22 is combined with the thermal storage medium from the hot storage tank 24 before passing through some part of the heat exchanger 16, or alternatively some proportion of the thermal storage medium from the hot storage tank is split off and directed to the intermediate storage tank 22 after passing through some other part of the heat exchanger 16.

In accordance with an exemplary embodiment, the flow rate of the various streams of thermal storage medium within the heat exchanger 16 can be controlled and modified to optimize round-trip efficiency of the transcritical TEES of the present disclosure. Further explanation follows herein with reference to FIG. 4.

Figure 4:
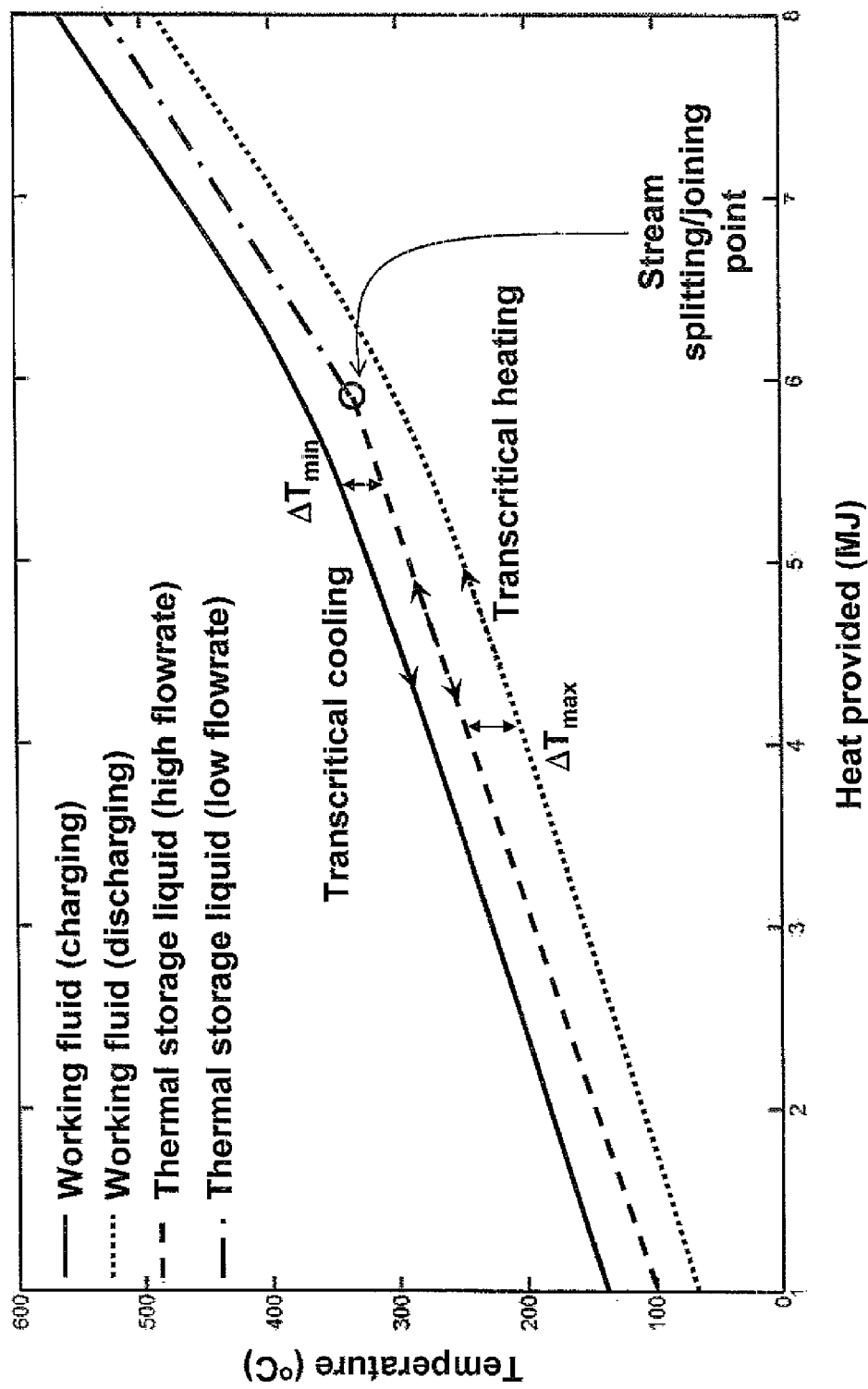
FIG. 4 shows a heat flow-temperature diagram of the heat transfer from the cycles in a transcritical TEES system according to an exemplary embodiment of the present disclosure.

FIG. 4 shows a heat flow-temperature diagram of the heat transfer in the heat exchanger 16 during the cycles in a TEES system in accordance with an exemplary embodiment of the present disclosure. The solid line indicates the temperature profile of the working fluid in the TEES charging cycle. The dotted line indicates the temperature profile of the working fluid in the TEES discharging cycle. The dashed line and dot-dashed line indicates the temperature profile of the thermal storage medium in the TEES cycles. The arrows indicate the flow directions in the heat exchanger 16. Heat can only flow from a higher to a lower temperature. Consequently, the characteristic profile for the working fluid during cooling in the charging cycle has to be above the characteristic profile for the thermal storage medium, which in turn has to be above the characteristic profile for the working fluid during heating in the discharging cycle.

In the exemplary embodiment represented in FIG. 4, the stream splitting/joining point is indicated at a thermal storage medium temperature of approximately 340° C. On the right hand side of this point on the graph, the gradient of the temperature profiles increases. This relatively increased gradient is shown by a dot-dashed line and is a consequence of a different flowrate of the thermal storage medium after the stream splitting/joining point. Thus, FIG. 4 illustrates the temperature profiles from a transcritical TEES in which two different flow rates of the thermal storage medium are present. The two flow rates may occur within a single heat exchanger, before and after the stream splitter. In accordance with another exemplary embodiment, having a first and a second heat exchanger in series separated by a stream splitter, there may be a different flow rate in each heat exchanger.

In this particular embodiment of the present disclosure, the temperature of the cold storage tank is approximately 100° C., the temperature of the intermediate storage tank is approximately 340° C., and the temperature of the hot storage tank is approximately 520° C. A minimum approach temperature of around 25° C. is assumed (e.g., the minimum temperature difference between two fluids exchanging heat is 25° C.). In such an embodiment, the flowrates of the thermal storage medium between the cold storage tank and the stream splitter, and between the stream splitter and hot storage tank, are controlled such that they have a ratio approximately 2:1.

It can be seen from FIG. 4 that the isobars representing the working fluid in the charging and discharging cycles closely follow the form of the isobar representing the thermal storage liquid. Thus, the temperature differences in both the charging and discharging cycles, $\Delta T_{min}$ and $\Delta T_{max}$, respectively, are significantly smaller than in the case without stream split depicted in FIG. 1. Thus, the roundtrip efficiency of the system is increased, regardless of the size of the heat exchanger.

The skilled person will be aware that, a heat flow-temperature diagram of the heat transfer in the heat exchanger may have a different form in accordance with another exemplary embodiment of the present disclosure. For example, it is possible the gradient of the working fluid isobar on the left of the stream splitting point is greater than the gradient of the working fluid isobar to the right of the splitting point. This would indicate that the streams output from the cold storage tank and the intermediate tank are joined at the stream splitter during charging, and divided at the stream splitter during discharging.

The temperature profiles are stationary in time due to the sensible heat storage in the thermal storage medium. Thus, while the volume of thermal storage medium in the heat exchanger remains constant, the volume of hot and cold thermal storage medium stored in the hot-fluid, intermediate and cold-fluid storage tanks changes. Also, the temperature distribution in the heat exchanger remains constant.

Figure 5:
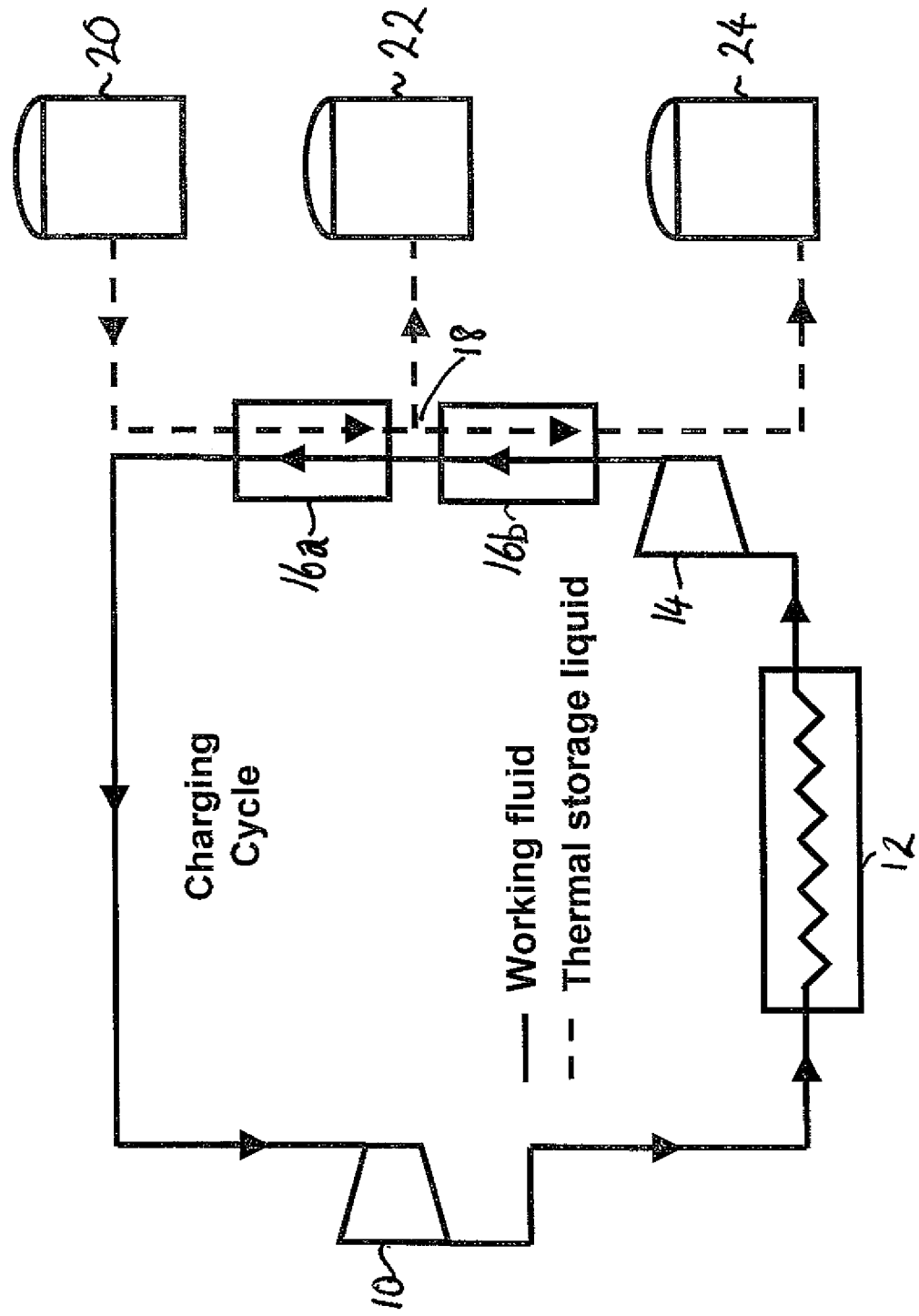
FIG. 5 shows a simplified schematic diagram of a charging cycle according to an exemplary embodiment of a transcritical TEES system of the present disclosure.

FIG. 5 illustrates an exemplary embodiment of the present disclosure in which two distinct heat exchangers 16a, 16b in series are separated by a stream splitter 18. FIG. 5 shows a charging cycle of this embodiment in which a first heat exchanger 16a is fed by thermal storage medium from the cold storage tank 20. The thermal storage medium leaving the first heat exchanger 16a enters a stream splitter 18, where a portion of the thermal storage medium is diverted to the intermediate storage tank 22. The remaining portion of the thermal storage medium is fed into a second heat exchanger 16b. The thermal storage medium leaving the second heat exchanger 16b is routed to the hot storage tank 24. The working fluid passes through both the first heat exchanger 16a and the second heat exchanger 16b, in the opposite direction to the thermal storage medium flow. The operation of this transcritical TEES system during a discharging cycle is equivalent to the cycle explained with respect to FIG. 3. Advantageously, this embodiment avoids the need to locate a stream splitter within a heat exchanger. It is noted that the point of variation of the flow rate occurs at the location of the stream splitter.

Figure 6:
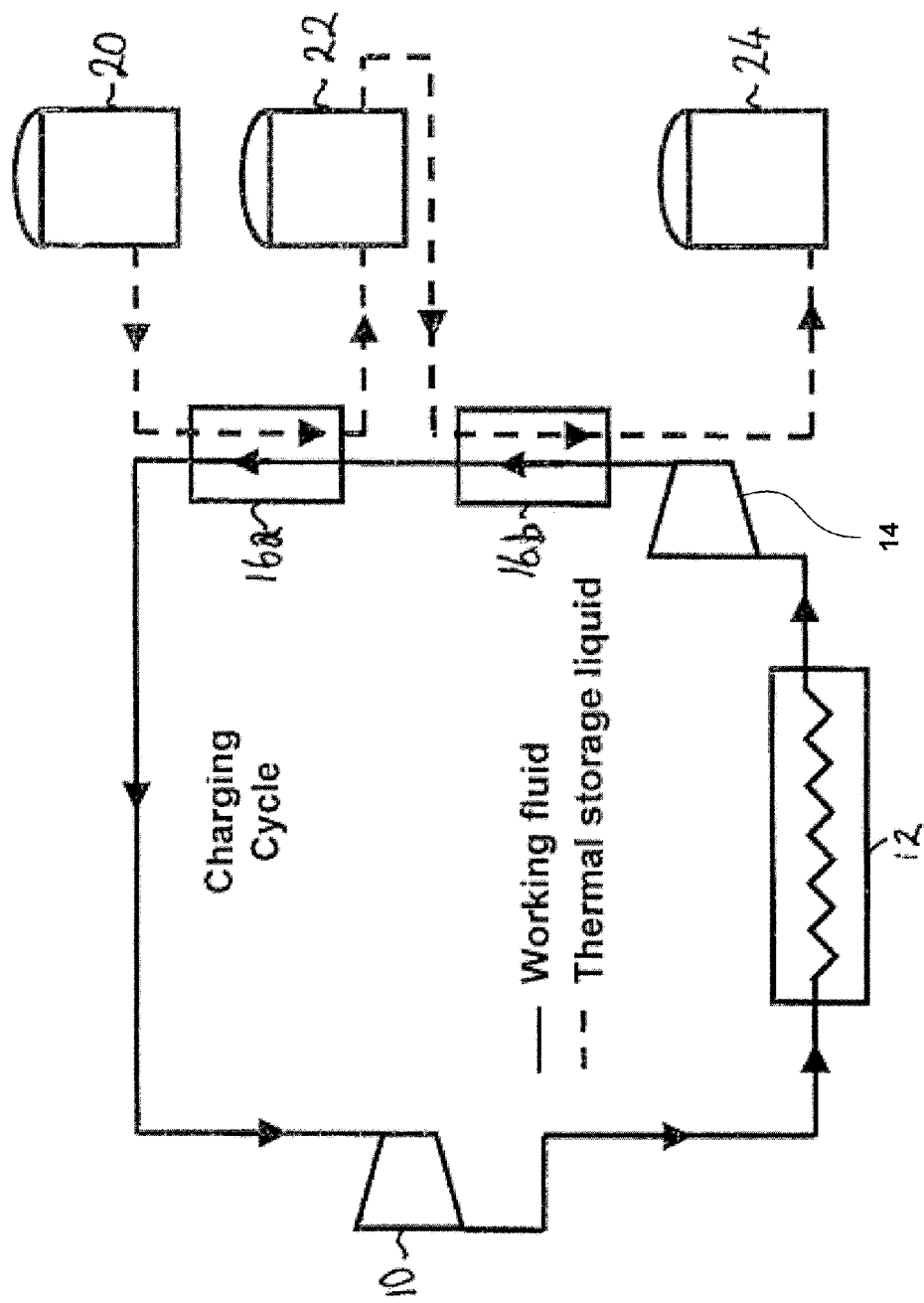
FIG. 6 shows a simplified schematic diagram of a charging cycle according to an exemplary embodiment of a transcritical TEES system of the present disclosure.

FIG. 6 illustrates an exemplary embodiment of the present disclosure, in which the heat exchanger 16a, 16b is sectioned to enable the thermal storage medium to enter and leave the intermediate storage tank 22 on a continuous path, instead of having an internal stream splitter arrangement. In this exemplary embodiment, during the TEES charging cycle, all the thermal storage medium from the cold storage tank 20 is routed to the intermediate storage tank 22 after a first heat exchanger section 16a, and then a portion of the thermal storage medium is piped out of the intermediate storage tank 22 and fed into a second heat exchanger section 16b and subsequently to the hot storage tank 24. The operation of this transcritical TEES system during a discharging cycle is equivalent to the cycle explained with respect to FIG. 3. Advantageously, this embodiment avoids the need for a stream splitter. The rate of flow of the thermal storage medium through the first and second heat exchangers 16a, 16b is controlled such that the representative isobar on a heat flow-temperature diagram (such as shown in FIG. 4) will closely follow the form of the isobars representing the working fluid. Consequently, there may be a variation in the flow rate of the thermal storage medium through each of the storage tanks. It is noted that the point of variation of the rate of flow occurs at the input or output of the intermediate storage tank 22.

In every embodiment of the present disclosure, where there is a variation in the flow rate through the intermediate storage tank, it is understood that variation in the flow rate from and to the cold and hot storage tanks will consequently occur.

The above descriptions of the charging cycles of FIG. 5 and FIG. 6 provided for inputting a portion of the thermal storage medium into the intermediate storage tank 22 during a charging cycle. However, it will be apparent to the skilled person, that the TEES system may output a portion of the thermal storage medium from the intermediate storage tank 22 during a charging cycle where this would result in the isobar representing the thermal storage medium running closely in parallel to the isobar representing the working fluid in a heat flow-temperature diagram of the heat transfer. In accordance with an exemplary embodiment of the present disclosure, a second intermediate thermal storage tank is added to the thermal storage medium circuit. A second stream splitting/joining point within the heat exchanger is provided in this embodiment. Where the streams in such a heat exchanger are controlled to have differing flow rates, then the associated temperature profile would show three distinct gradient sections. This embodiment would be represented by a further linear section in the thermal storage medium temperature profile, thereby enabling the temperature profiles of the working fluid and the thermal storage medium to follow parallel paths more exactly.

Further embodiments of the present disclosure are envisaged in which a third (or higher count) intermediate thermal storage tank is added to the thermal storage medium circuit. Again, a third (or further) stream splitting/joining point within the heat exchanger is provided in such further embodiments. The streams in such a heat exchanger may be controlled to have differing flow rates. The skilled person will understand the advantage of enabling the addition of one or more further distinct linear sections in the associated thermal storage medium temperature profile to increase round-trip efficiency. It is also possible to realize such embodiments with distinct heat exchangers in series separated by the stream splitting/joining valve and piping arrangements or with direct connections to the intermediate storage tanks.

In accordance with an exemplary embodiment, the heat exchanger is a countercurrent flow heat exchanger, and the working fluid of the cycle can be carbon dioxide, for example. Further, the thermal storage medium is a fluid, such as water, for example. In accordance with an exemplary embodiment, the compressor of the present embodiment can be an electrically powered compressor. The skilled person will be aware that the TEES system, as illustrated in FIGS. 2 and 3, may be realized in several different ways. Alternative embodiments include:

Different working fluids may be utilized for the charging and discharging cycles in order to maximize the roundtrip efficiency. Examples of working fluids that may be used are any refrigerant with a critical temperature below the high temperature level of the cycles.

Either the ambient or a dedicated cold storage can be used as a heat source for the charging cycle and a heat sink for discharging cycle. The cold storage can be realized by producing an ice-water mixture during charging of the storage, and using the stored ice-water mixture to condense the working fluid during the discharge cycle.

While the thermal storage medium may be water (if necessary, in a pressurized container), other materials, such as oil or molten salt, may also be used. Advantageously, water has relatively good heat transfer and transport properties and a high heat capacity, and therefore a relatively small volume is required for a predetermined heat storage capability. Clearly, water is non-flammable, non-toxic and environmentally friendly. Choice of a cheap thermal storage medium would contribute to a lower overall system cost.

Multiple hot storage tanks instead of a single hot storage tank or multiple cold storage tanks instead of a single cold storage tank could be utilized within the present inventive concept. This could be envisaged where, for example, two small cold storage tanks are more practical than a single large storage tank.

The skilled person will be aware that the condenser and the evaporator in the TEES system may be replaced with a multi-purpose heat exchange device that can assume both roles, since the use of the evaporator in the charging cycle and the use of the condenser in the discharging cycle will be carried out in different periods. Similarly, the turbine and the compressor roles can be carried out by the same machinery, referred to herein as a thermodynamic machine, capable of achieving both tasks.

In accordance with an exemplary embodiment, the working fluid for the present disclosure can be carbon dioxide, which can be chosen mainly due to the higher efficiencies in heat transfer processes and the amiable properties of carbon dioxide as a natural working fluid, for example, non-flammable, no ozone depletion potential, no health hazards etc. However, the present disclosure is not limited thereto, as other suitable working fluids are also envisaged.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A thermoelectric energy storage system having a charging cycle for providing thermal energy to a thermal storage, and a discharging cycle for generating electricity by retrieving the thermal energy from the thermal storage, the thermoelectric energy storage system comprising:
   a heat exchanger;
   a working fluid circuit for circulating a working fluid through the heat exchanger, the working fluid undergoing a transcritical process during heat transfer in the heat exchanger;
   a thermal storage medium circuit for circulating a thermal storage medium, the thermal storage medium circuit having at least one hot storage tank, an intermediate temperature storage tank and a cold storage tank connected together via the heat exchanger; and
   means for modifying a rate of flow of the thermal storage medium in the heat exchanger, the means for modifying including an internal stream splitter configured to vary an input rate of flow of the thermal storage medium to the intermediate storage tank, and to vary an output rate of flow of the thermal storage medium from the intermediate storage tank,
   wherein the means for modifying modifies the rate of flow of the thermal storage medium to minimize a temperature difference between the working fluid and the thermal storage medium during the charging and discharging cycles, and
   wherein the internal stream splitter is comprised in the heat exchanger, and the internal stream splitter is configured to one of divide and join the stream of the thermal storage medium from the intermediate storage tank.

2. A thermoelectric energy storage system having a charging cycle for providing thermal energy to a thermal storage, and a discharging cycle for generating electricity by retrieving the thermal energy from the thermal storage, the thermoelectric energy storage system comprising:
   a heat exchanger;
   a working fluid circuit for circulating a working fluid through the heat exchanger, the working fluid undergoing a transcritical process during heat transfer in the heat exchanger;
   a thermal storage medium circuit for circulating a thermal storage medium, the thermal storage medium circuit having at least one hot storage tank, an intermediate temperature storage tank and a cold storage tank connected together via the heat exchanger; and
   means for modifying a rate of flow of the thermal storage medium in the heat exchanger, the means for modifying including an internal stream splitter configured to vary an input rate of flow of the thermal storage medium to the intermediate storage tank, and to vary an output rate of flow of the thermal storage medium from the intermediate storage tank, wherein:
   the means for modifying modifies the rate of flow of the thermal storage medium to minimize a temperature difference between the working fluid and the thermal storage medium during the charging and discharging cycles;
   the heat exchanger is divided into a first section and a second section, and the heat exchanger is configured for the thermal storage medium to flow through both the first section and the second section;
   the internal stream splitter is arranged between the first section and second section of the heat exchanger; and
   the internal stream splitter is configured to one of divide and join the stream of the thermal storage medium from the intermediate storage tank.

3. A thermoelectric energy storage system having a charging cycle for providing thermal energy to a thermal storage, and a discharging cycle for generating electricity by retrieving the thermal energy from the thermal storage, the thermoelectric energy storage system comprising:
   a heat exchanger;
   a working fluid circuit for circulating a working fluid through the heat exchanger, the working fluid undergoing a transcritical process during heat transfer in the heat exchanger;
   a thermal storage medium circuit for circulating a thermal storage medium, the thermal storage medium circuit having at least one hot storage tank, an intermediate temperature storage tank and a cold storage tank connected together via the heat exchanger; and
   means for modifying a rate of flow of the thermal storage medium in the heat exchanger, the means for modifying including an internal stream splitter configured to vary an input rate of flow of the thermal storage medium to the intermediate storage tank, and to vary an output rate of flow of the thermal storage medium from the intermediate storage tank,
   wherein the means for modifying modifies the rate of flow of the thermal storage medium to minimize a temperature difference between the working fluid and the thermal storage medium during the charging and discharging cycles, and
   wherein the heat exchanger is divided into a first section and a second section, and the heat exchanger is configured for the thermal storage medium to flow through both the first section and the second section via the intermediate storage tank.

4. The system according to claim 1, comprising:
   at least one further intermediate storage tank connected in the thermal storage medium circuit,
   wherein the heat exchanger has a further internal stream splitter for each further intermediate storage tank.

5. The system according to claim 1, wherein both the charging and discharging cycle run transcritically.

6. A method for storing and retrieving energy in a thermoelectric energy storage system, the method comprising:
   circulating a thermal storage medium between a hot storage tank, an intermediate storage tank and a cold storage tank connected together via a heat exchanger;
   charging the system by heating the thermal storage medium;
   discharging the system by heating a working fluid in a working fluid circuit with heat from the thermal storage medium, the working fluid undergoing a transcritical process during heat transfer in the heat exchanger, and expanding the working fluid through a thermodynamic machine; and modifying a rate of flow of the thermal storage medium through the heat exchanger by varying the input rate of flow of thermal storage medium to the intermediate storage tank, and by varying the output rate of flow of thermal storage medium from the intermediate storage tank, wherein the step of modifying the rate of flow comprises minimizing the temperature difference between the working fluid and the thermal storage medium during the charging and discharging cycles, and wherein the method comprises one of dividing and joining the stream of the thermal storage medium from the intermediate storage tank.

7. The method according to claim 6, comprising:
connecting at least one further intermediate storage tank via the heat exchanger; and
further one of dividing and joining the stream of the thermal storage medium for each further intermediate storage tank.

8. The method according to claim 6, wherein both the charging and the discharging cycle are performed transcritically.

9. The system according to claim 1, wherein:
the heat exchanger is divided into a first section and a second section, and the heat exchanger is configured for the thermal storage medium to flow through both the first section and the second section; and
the stream splitter is arranged between the first section and second section of the heat exchanger.

10. The system according to claim 9, wherein both the charging and discharging cycle run transcritically.

11. The system according to claim 2, wherein both the charging and discharging cycle run transcritically.

12. The system according to claim 3, wherein both the charging and discharging cycle run transcritically.

13. The system according to claim 4, wherein both the charging and discharging cycle run transcritically.

14. A thermoelectric energy storage system having a charging cycle for providing thermal energy to a thermal storage, and a discharging cycle for generating electricity by retrieving the thermal energy from the thermal storage, the thermoelectric energy storage system comprising:
a heat exchanger;
a working fluid circuit for circulating a working fluid through the heat exchanger, the working fluid undergoing a transcritical process during heat transfer in the heat exchanger;
a thermal storage medium circuit for circulating a thermal storage medium, the thermal storage medium circuit having at least one hot storage tank, an intermediate temperature storage tank and a cold storage tank connected together via the heat exchanger; and
means for modifying a rate of flow of the thermal storage medium in the heat exchanger, the means for modifying including an internal stream splitter configured to vary an input rate of flow of the thermal storage medium to the intermediate storage tank, and to vary an output rate of flow of the thermal storage medium from the intermediate storage tank, and
wherein the thermoelectric energy storage system comprises at least one of:
a plurality of intermediate storage tanks; and
a plurality of cold storage tanks.

15. The method according to claim 7, wherein both the charging and the discharging cycle are performed transcritically.

16. The system according to claim 14, wherein both the charging and discharging cycle run transcritically.

* * * * *